United States Patent
Lee et al.

(10) Patent No.: US 9,286,656 B2
(45) Date of Patent: Mar. 15, 2016

(54) HOMOGRAPHY ESTIMATION APPARATUS AND METHOD

(71) Applicant: Chung-Ang University Industry-Academy Cooperation Foundation, Seoul (KR)

(72) Inventors: Sangkeun Lee, Seoul (KR); Sangwon Seo, Gyeonggi-Do (KR); Soowoong Jeong, Seoul (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 132 days.

(21) Appl. No.: 14/134,501

(22) Filed: Dec. 19, 2013

(65) Prior Publication Data

US 2014/0177968 A1    Jun. 26, 2014

(30) Foreign Application Priority Data

Dec. 20, 2012  (KR) .................. 10-2012-0149478
Mar. 26, 2013  (KR) .................. 10-2013-0032320

(51) Int. Cl.
  *G06K 9/48*   (2006.01)
  *G06T 3/40*   (2006.01)
  *G06T 3/00*   (2006.01)
  (Continued)

(52) U.S. Cl.
  CPC ............ *G06T 3/4084* (2013.01); *G06K 9/6211* (2013.01); *G06T 3/0068* (2013.01); *G06T 3/4038* (2013.01); *G06T 7/003* (2013.01)

(58) Field of Classification Search
  None
  See application file for complete search history.

(56) References Cited

U.S. PATENT DOCUMENTS

| 2004/0189674 A1* | 9/2004 | Zhang et al. ................... 345/629 |
| 2005/0089244 A1* | 4/2005 | Jin .......................... G06K 9/209 |
|  |  | 382/284 |
| 2010/0149183 A1* | 6/2010 | Loewke et al. ............... 345/424 |

FOREIGN PATENT DOCUMENTS

| JP | 2006-42361 | 2/2006 |
| KR | 10-2008-0083525 | 9/2008 |

(Continued)

OTHER PUBLICATIONS

Brown, Matthew, and David G. Lowe. "Automatic panoramic image stitching using invariant features." International journal of computer vision 74.1 (2007): 59-73. 15 pages.*

(Continued)

*Primary Examiner* — Sumati Lefkowitz
*Assistant Examiner* — Ryan P Potts
(74) *Attorney, Agent, or Firm* — Mintz Levin Cohn Ferris Glovsky and Popeo, P.C.; Kongsik Kim; Jonathon P. Western

(57) ABSTRACT

Disclosed are a homography estimation apparatus and method. A down-sampling unit reduces the reference image and the target image to the same size to generate down-sampled images. A feature point extraction unit extracts feature points from the reference image and the target image down-sampled to the same size, respectively. An outlier removal unit matches the feature points extracted from the reference image with the feature points extracted from the target image, and detects and removes outliers, which are feature points that do not match, from the matched feature points. A homography estimation unit estimates a homography using feature points from which outliers are removed. A reference image correction unit corrects the reference image using the estimated homography.

9 Claims, 10 Drawing Sheets

(51) Int. Cl.
*G06T 7/00* (2006.01)
*G06K 9/62* (2006.01)

(56) References Cited

FOREIGN PATENT DOCUMENTS

| KR | 10-2012-0021666 | 3/2012 |
| KR | 10-2013-0056605 | 5/2013 |

OTHER PUBLICATIONS

Brown, Matthew, Richard Szeliski, and Simon Winder. "Multi-image matching using multi-scale oriented patches." Computer Vision and Pattern Recognition, 2005. CVPR 2005. IEEE Computer Society Conference on. vol. 1. IEEE, 2005. 8 pages.*

* cited by examiner

INPUT IMAGE

PANORAMA IMAGE

INPUT IMAGE | IMAGE FROM WHICH FEATURE POINTS HAVE BEEN EXTRACTED

INPUT IMAGE

IMAGE FROM WHICH FEATURE POINTS HAVE BEEN EXTRACTED

FEATURE POINTS OF REFERENCE IMAGE    FEATURE POINTS OF TARGET IMAGE

IMAGE FROM WHICH FEATURE POINTS HAVE BEEN EXTRACTED

IMAGE FROM WHICH OUTLIERS HAVE BEEN REMOVED

FEATURE POINTS OF REFERENCE IMAGE

FEATURE POINTS OF TARGET IMAGE

IMAGE RESULTING FROM
CONVENTIONAL METHOD
(62.3403s)

IMAGE RESULTING FROM
PRESENT INVENTION
(21.4721s)

REFERENCE IMAGE

TARGET IMAGE

IMAGE RESULTING FROM
CONVENTIONAL METHOD
(49.7121s)

IMAGE RESULTING FROM
PRESENT INVENTION
(17.6735s)

REFERENCE IMAGE

TARGET IMAGE

IMAGE RESULTING FROM
CONVENTIONAL METHOD
(265.7064s)

IMAGE RESULTING FROM
PRESENT INVENTION
(49.5913s)

REFERENCE IMAGE

TARGET IMAGE

IMAGE RESULTING FROM CONVENTIONAL METHOD (19.7001s)

IMAGE RESULTING FROM PRESENT INVENTION (7.1309s)

HOMOGRAPHY ESTIMATION APPARATUS AND METHOD

CROSS-REFERENCE TO RELATED APPLICATION

This application claims priority to and the benefit of Korean Application No. 10-2012-0149478 filed on Dec. 20, 2012 and Korean Application No. 10-2013-0032320 filed on Mar. 26, 2013, which applications are incorporated herein by references.

TECHNICAL FIELD

The present invention relates to a homography estimation apparatus and method, and more particularly, to a homography estimation apparatus and method for reducing sizes of a reference image and a target image and extracting feature points to estimate a homography.

RELATED ART

In projective geometry, a homography represents a relationship between two planes as a 3×3 matrix. A homography is used in representing a relationship between a real-world plane and an image of the plane produced by a camera. Homography is used to match high-definition (HD) images to form an ultra high-definition (UHD) image, which is a recent issue. Japan leads the world in ultra high-definition broadcasting, and NHK demonstrated ultra high-definition broadcasting through satellite and cable networks in 2010 and will broadcast programs using ultra high-definition broadcasting in 2020. A UHD TV is a recent issue, and LG electronics announced an 84-inch 3D UHD TV at CES in 2013. 4G broadcasting services such as 4K and 8K will be provided in the future and UHD technology will replace HD technology.

To provide a brief description of some conventional art documents, Korean Laid-Open Patent Application No. 2012-0021666, entitled "PANORAMA IMAGE GENERATING METHOD," discloses a method of generating a panorama image using a feature extraction method having robust size and rotation conversion and enhanced processing speed.

Also, Korean Laid-Open Patent Application No. 2008-0083525, entitled "METHOD FOR STABILIZING DIGITAL IMAGE WHICH CAN CORRECT THE HORIZONTAL SHEAR DISTORTION AND VERTICAL SCALE DISTORTION," discloses a method for correcting an image using a homography representing a correlation between two image frames used in a typical panorama image event when an image is distorted as well as when the image is moved in a horizontal/vertical direction because of hand shaking.

SUMMARY

The present invention is directed to a homography estimation apparatus and method that down-sample a reference image and a target image to thereby significantly reduce a feature point extraction time and a homography estimation time, and also a time required to calculate a homography for an original image from the estimated homography.

The present invention is also directed to a computer-readable recording medium for executing on a computer a homography estimation method that down-samples a reference image and a target image to thereby significantly reduce a feature point extraction time and a homography estimation time, and also a time required to calculate a homography for an original image from the estimated homography.

According to an aspect of the present invention, there is provided a homography estimation apparatus including: a down-sampling unit configured to reduce a reference image and a target image to the same size to generate down-sampled images; a feature point extraction unit configured to extract feature points from the reference image and the target images that are down-sampled to the same size, respectively; an outlier removal unit configured to match the feature points extracted from the reference image with the feature points extracted from the target image to detect and remove outliers, which are feature points that do not match, from the matched feature points; a homography estimation unit configured to estimate a homography using the feature points from which the outliers have been removed; and a reference image correction unit configured to correct the reference image using the estimated homography.

According to another aspect of the present invention, there is provided a homography estimation method performed by a homography estimation apparatus including: (a) a down-sampling operation of reducing a reference image and a target image to the same size to generate down-sampled images; (b) a feature point operation of extracting feature points from the reference image and the target images that are down-sampled to the same size, respectively; (c) an outlier removal operation of matching the feature points extracted from the reference image with the feature points extracted from the target image to detect and remove outliers, which are feature points that do not match, from the matched feature points; (d) a homography estimation operation of estimating a homography using the feature points from which the outliers have been removed; and (e) a reference image correction operation of correcting the reference image using the estimated homography.

According to still another aspect of the present invention, there is provided a computer-readable recording medium storing a computer program for executing the method described above.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION

Hereinafter, a homography estimation apparatus and method according to the present invention will be described in detail with reference to the accompanying drawings.

Figure 1:
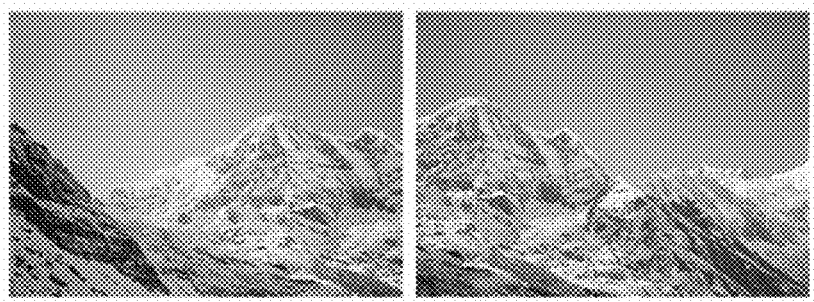
FIG. 1 is a view showing a panorama image to which a homography estimation method is applied according to the present invention.
Figure 1:
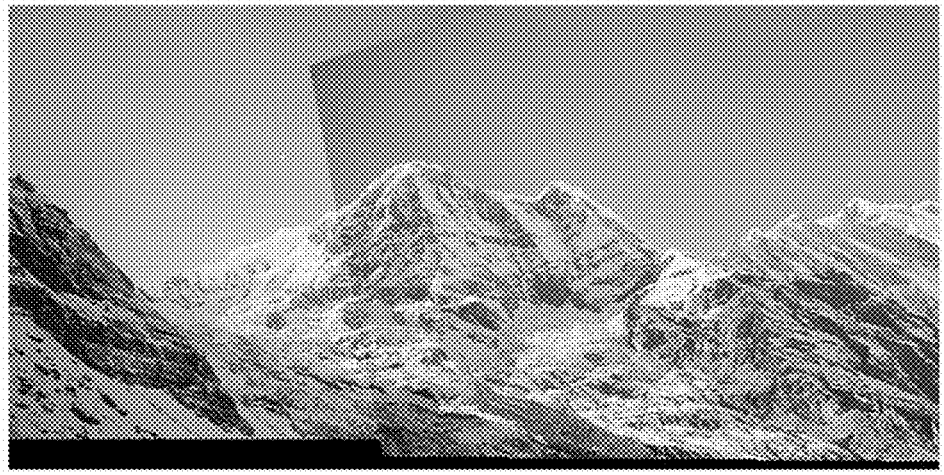

FIG. 1 is a view showing a panorama image to which a homography estimation method may be applied according to the present invention. The panorama image is image processing technology that receives multiple images and combines them into one image. That is, as shown in FIG. 1, it can be seen that two different input images are combined into one image. In other words, a panorama image may be generated by matching a reference image with a target image using a homography estimated through the homography estimation apparatus and method according to the present invention.

Figure 2:
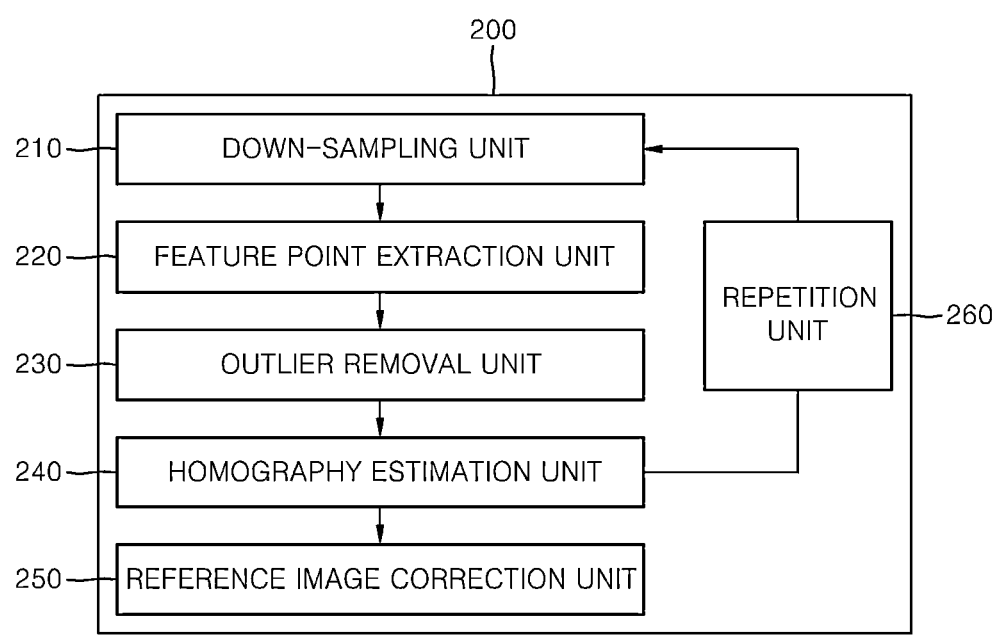
FIG. 2 is a block diagram showing a configuration of a homography estimation apparatus according to the present invention.

FIG. 2 is a block diagram showing a configuration of a homography estimation apparatus 200 according to the present invention. The homography estimation apparatus 200 according to the present invention includes a down-sampling unit 210, a feature point extraction unit 220, an outlier removal unit 230, a homography estimation unit 240, a reference image correction unit 250, and a repetition unit 260.

Figure 9:
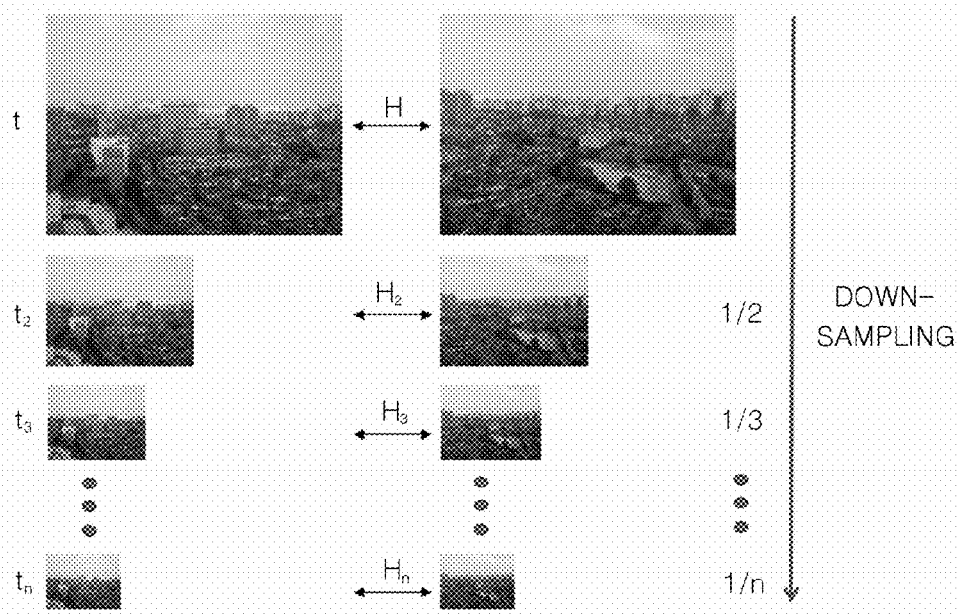
FIG. 9 is a view showing down-sampling of an input original image n times to estimate a homography.
Figure 10:
FIGS. 10 to 17 are views comparing an image obtained using a homography estimation method according to the present invention with an image obtained using a conventional method.

The down-sampling unit 210 reduces the reference image and the target image to the same size to generate down-sampled images. Referring to FIG. 9, images obtained by down-sampling the original image to one half, one third, . . . , one n-th are shown. That is, an estimation method performed by the homography estimation apparatus 200 according to the present invention is a homography estimation method based on the down-sampling of each image.

Figure 3:
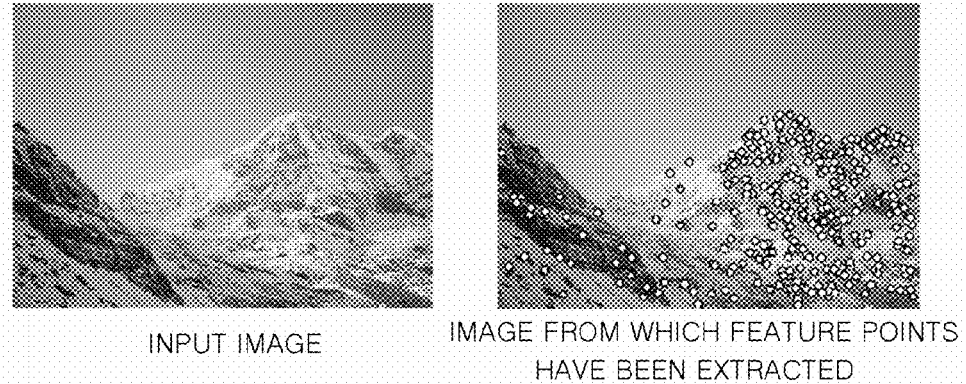
FIGS. 3 and 4 are views showing an image having a feature point extracted from an input image using a SIFT algorithm.
Figure 4:
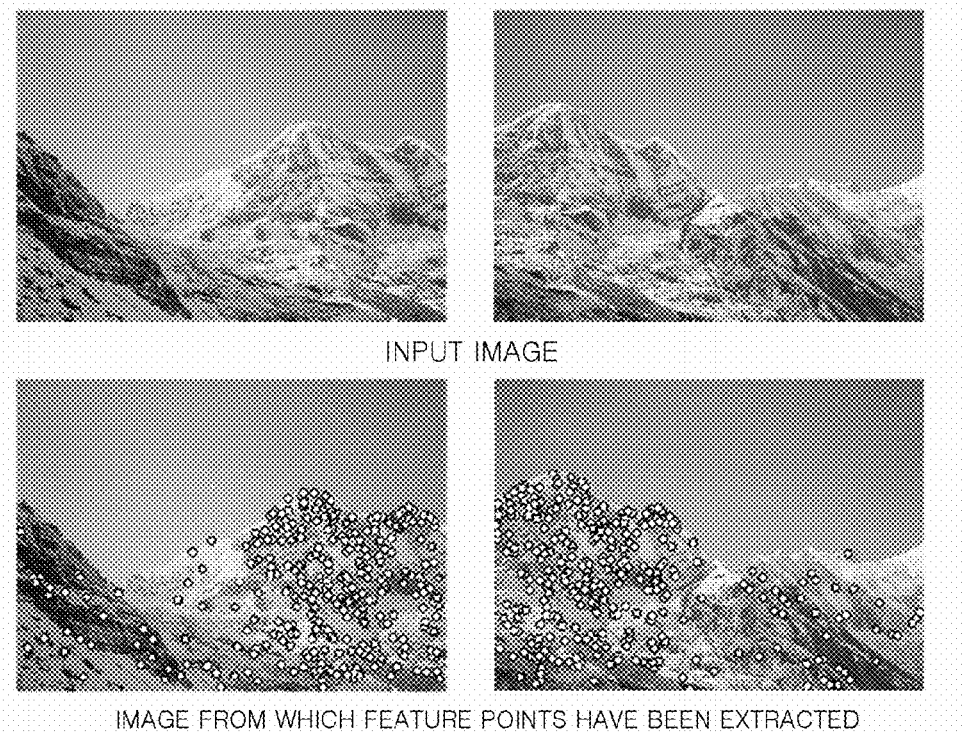

The feature point extraction unit 220 extracts feature points from the reference image and the target image down-sampled to the same size, respectively. In this case, the feature points may be extracted from the images using a Scale Invariant Feature Transform (SIFT) algorithm. The SIFT algorithm is well known to those skilled in the art, so a detailed description thereof will be omitted. Referring to FIGS. 3 and 4, it can be seen that an input image and an image having feature points extracted from the input image are compared and shown.

Figure 5:
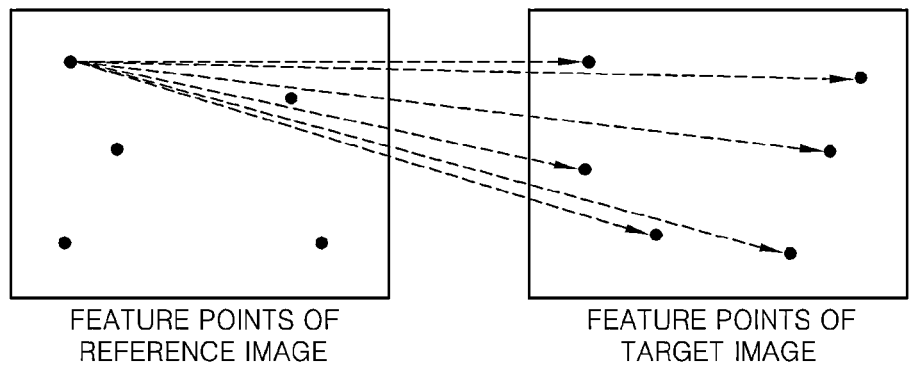
FIG. 5 is a view showing matching between a feature point of a reference image and a feature point extracted from a target image.

As described above, a process of extracting feature points from the reference image and the target image and then matching the feature points extracted from the images is performed. In this case, each feature point has coordinate information (x, y) and descriptor information, and an error between feature points may be found by calculating an error in a descriptor, where a point having a low error may be a matching point. Referring to FIG. 5, any feature point is selected from among the feature points of the reference image, and then errors are calculated between the feature point and feature points extracted from the target point. Finally, the matching point is a feature point having the smallest error.

Figure 6:
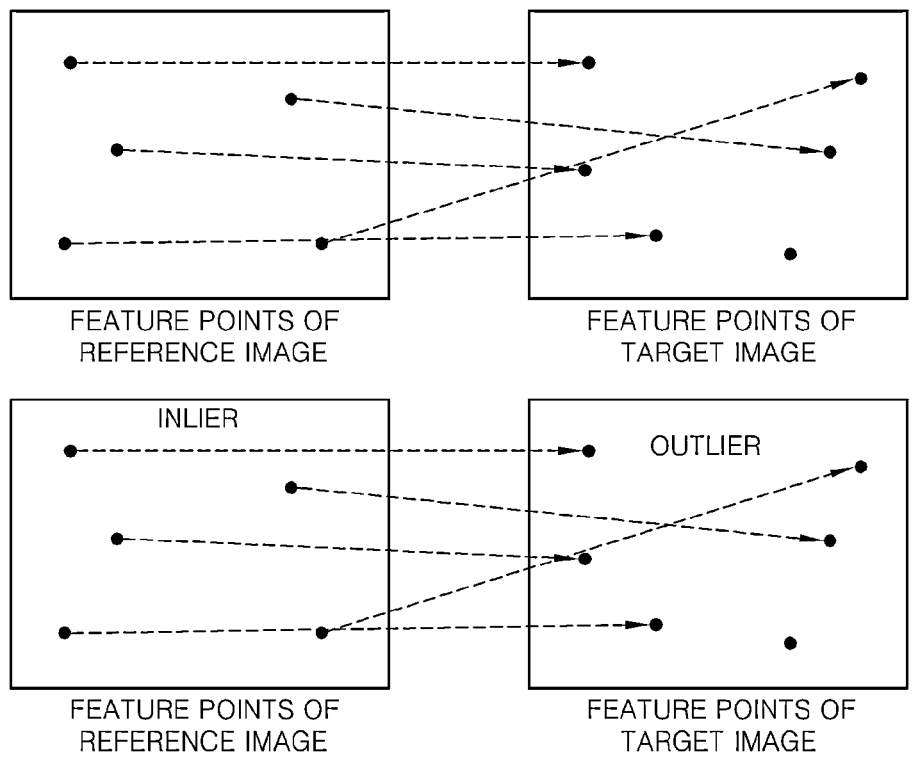
FIG. 6 is a view showing matching between a feature point of a reference image and a feature point extracted from a target image to remove outliers, which are feature points that do not match.
Figure 7:
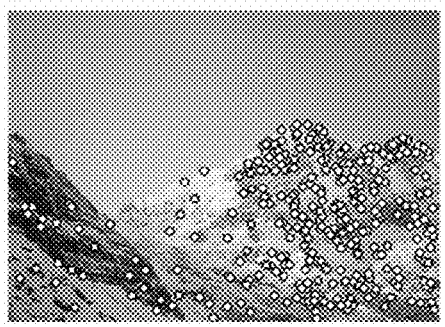
FIG. 7 is a view showing an image from which outliers have been removed using an RANSAC algorithm.
Figure 7:
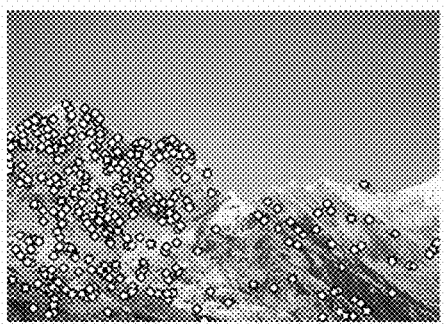
Figure 7:
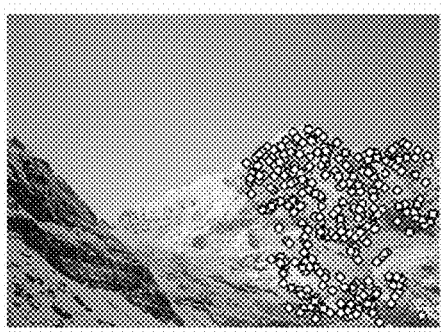

Also, when the feature points are matched between the reference image and the target image, mismatches should be removed. In this case, an accurate match is referred to as an inlier, and an inaccurate match is referred to as an outlier. Referring to FIG. 6, detection of the non-matching outliers is shown. The detected outliers are removed by the outlier removal unit 230. In this case, the outlier removal unit 230 may detect and remove the outliers using a RANdom SAmple Consensus (RANSAC) algorithm. The RANSAC algorithm is well known to those skilled in the art, so a detailed description thereof will be omitted. Referring to FIG. 7, it can be seen that an image having feature points extracted from the input image and an image from which outliers are removed are compared and shown.

The homography estimation unit 240 estimates a homography using feature points from which outliers are removed. The homography may represent a relationship between the reference image and the target image as a matrix equation in Equation (1).

$$X = HX'' \quad (1)$$

Here, X are coordinates of the reference image, X' are coordinates of the target image, H is a homography represented as a matrix $$\begin{bmatrix} h_{11} & h_{12} & h_{13} \\ h_{21} & h_{22} & h_{23} \\ h_{31} & h_{32} & h_{33} \end{bmatrix},$$

and $h_{33}$ is a scale factor, which is set to be 1.

Figure 8:
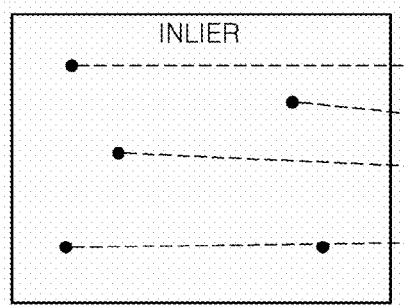
FIG. 8 is a view showing 4 coordinates (x, y) in the reference image and target image in order to calculate the homography in a state in which outliers have been removed.
Figure 8:
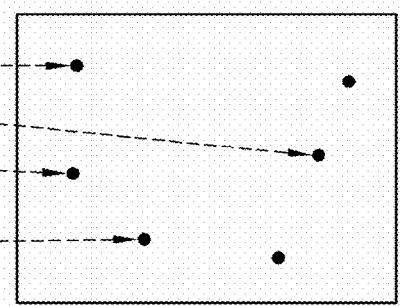

To calculate the homography, four points (x, y) for each image are needed. Referring to FIG. 8, four points corresponding to inliers among feature points extracted from the reference image and target image are shown.

In this case, the homography may be calculated using Equation (2) and Equation (3) through a Direct Linear Transform (DLT) algorithm. The DLT algorithm is well known to those skilled in the art, so a detailed description thereof will be omitted.

$$\begin{bmatrix} O^T & w'_i X_i^T & y'_i X_i^T \\ w'_i X_i^T & O^T & x'_i X_i^T \end{bmatrix} \begin{pmatrix} h^1 \\ h^2 \\ h^3 \end{pmatrix} = 0 \quad (2)$$

$$\begin{bmatrix} O^T & -w'_i X_i^T & y'_i X_i^T \\ w'_i X_i^T & O^T & -x'_i X_i^T \end{bmatrix} \begin{pmatrix} h^1 \\ h^2 \\ h^3 \end{pmatrix} = 0$$

Here, $X_i^T:(x_i, y_i, w_i)$ is the reference image, and $X_i^{T'}:(x_i', y_i', w_i')$ is the target image.

$$\begin{bmatrix} 0 & 0 & 0 & -w'_i x_i & -w'_i y_i & -w'_i w_i & y'_i x_i & y'_i y_i & y'_i w_i \\ w'_i x_i & w'_i y_i & w'_i w_i & 0 & 0 & 0 & -x'_i x_i & -x'_i y_i & -x'_i w_i \end{bmatrix} \begin{pmatrix} h_{11} \\ h_{21} \\ h_{31} \\ h_{12} \\ h_{22} \\ h_{32} \\ h_{13} \\ h_{23} \\ h_{33} \end{pmatrix} \quad (3)$$

Here, I=1, 2, 3, and 4. Also, an unknown value H is calculated through Singular Value Decomposition (SVD).

The repetition unit 260 down-samples an image, extracts feature points, removes outliers, and repeats the process of estimating a homography n times (n is a positive integer equal to or greater than 2), thus estimating n homographies having different sizes, as shown is FIG. 9.

The reference image correction unit 250 corrects the reference image using the estimated homography. That is, the reference image correction unit 250 calculates a homography error, which is the difference between coordinates of the reference image and estimated homography coordinates, for each of the n homographies estimated by the repetition unit 260, selects a homography having the smallest error value among the homography error values, and corrects the reference image using the selected homography. A panorama image generation unit (not shown) may match the target image with the reference image to generate a panorama image using the homography estimated via the process.

In this case, the total calculation time required to down-sample the image n times and calculate a homography several times is longer than the time required to calculate a homography for the original image. The difference increases as the size of the image increases. In this case, the number of repetitions may be determined on the basis of the number of feature points that are down-sampled and extracted. That is, if the number of feature points is too small, the number of repetitions may increase.

$$t > \sum_{i=2}^{n} t_i \quad (4)$$

Here, t is the time required to calculate the homography for the original image, and $t_i$ is the time required to i-th down-sample the original image and then calculate the homography.

Table (1) shows test results for a real image, in which a homography is estimated for each down-sampled image to calculate projection errors for the reference image and the target image, respectively, using Equation (5). In this case, it can be seen that the scale of the smallest homography error is one seventh. Accordingly, the homography estimated when down-sampled to one seventh is selected as an optimal homography and may be used as H' in Equation (6).

TABLE (1)

| scale | 1 | 1/2 | 1/3 | 1/4 | 1/5 | 1/6 | 1/7 | 1/8 | Total time without scale 1(s) |
|---|---|---|---|---|---|---|---|---|---|
| Homography Error | | 4.0164 | 2.9108 | 2.9325 | 2.1446 | 3.7637 | 1.7559 | 2.4822 | |
| Time(s) | 88.8566 | 15.3202 | 5.7143 | 3.1452 | 1.9317 | 1.3442 | 0.9696 | 0.7099 | 29.1351 |

$$\|\varepsilon\| = |X - \hat{X}| \quad (5)$$

$$H = \begin{bmatrix} 1 & 0 & 0 \\ 0 & 1 & 0 \\ 0 & 0 & 1/m \end{bmatrix} H' \begin{bmatrix} 1 & 0 & 0 \\ 0 & 1 & 0 \\ 0 & 0 & m \end{bmatrix} = \begin{bmatrix} h_{11} & h_{12} & h_{13} \\ h_{21} & h_{22} & h_{23} \\ h_{31} & h_{32} & h_{33} \end{bmatrix} \quad (6)$$

Here, H is a corrected homography, H' is a homography calculated from a down-sampled image, m is a scale factor that indicates the extent to which an image is reduced when H' is calculated, $h_{13}$ and $h_{23}$ are values obtained by multiplying by m, and $h_{31}$ and $h_{32}$ are values obtained by multiplying by 1/m.

The conventional method has a limitation in that it takes a long time to extract feature points and remove outliers from the feature points when calculating a homography of a high-definition image such as an ultra high-definition (UHD) image. Furthermore, an inaccurate homography or no homography may be calculated. However, the homography estimation method according to the present invention down-samples an input image n times (n is a positive integer equal to or greater than two), extracts feature points from the input image, and remove outliers from the feature points, thereby improving its rate. Also, the method calculates error values of homographies of the down-sampled images, selects an optimal homography having the smallest error value, and performs correction to apply the selected homography to the original image size.

Figure 11:
Figure 11:
Figure 12:
Figure 12:
Figure 13:
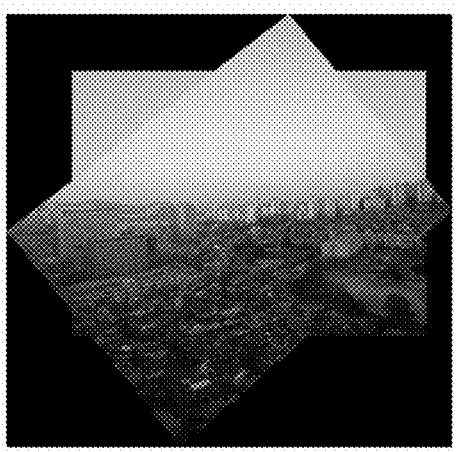
Figure 13:
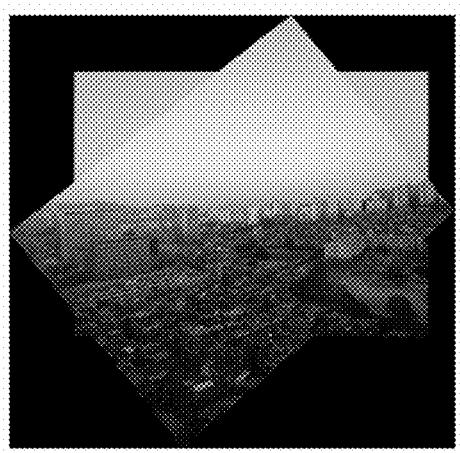
Figure 14:
Figure 14:
Figure 15:
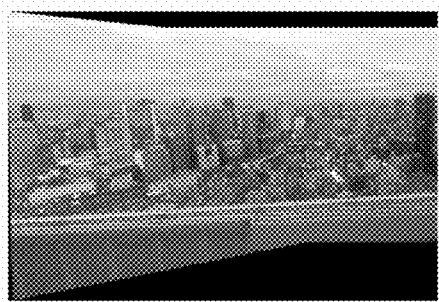
Figure 15:
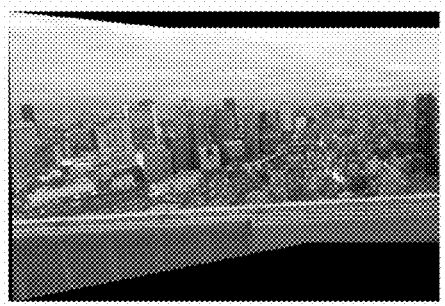
Figure 16:
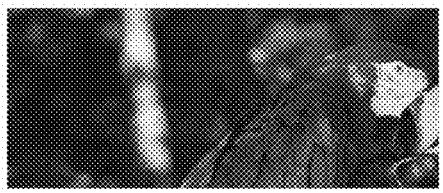
Figure 16:
Figure 17:
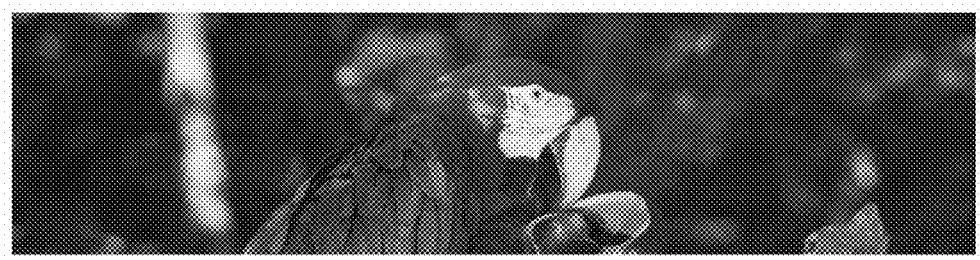
Figure 17:
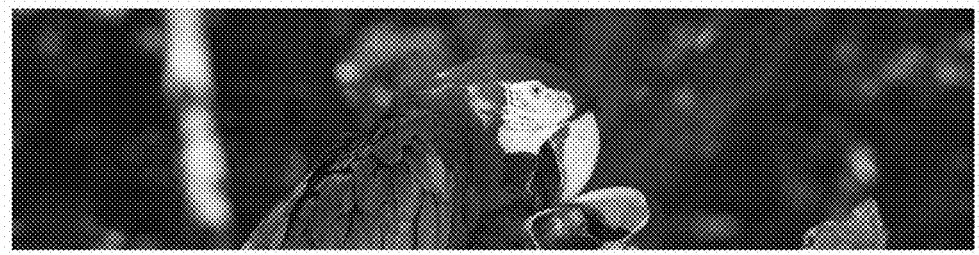

A result image obtained by applying the homography estimation method according to the present invention may be seen in FIGS. 10 to 17. Specifically, referring to FIG. 10, each image used in an experiment had a size of 2048*1536. Referring to FIG. 11, when comparing the two result images obtained by combining the reference image and the target image shown in FIG. 10 into one panorama image, it seems that there is little difference between the result images, but the time required to produce the result image according to the present invention is reduced to about one-third of the time taken by the conventional method. Referring to FIG. 12, each image used in an experiment had a size of 2048*1536. Referring to FIG. 13, it also seems that there is little difference between the result images, but the time required to produce the result image according to the present invention is reduced to about one-third of the time taken by the conventional method. Referring to FIG. 14, each image used in an experiment had a size of 3264*2448. Referring to FIG. 15, it also seems that there is little difference between the result images, but the time required to produce the result image according to the present invention is reduced to about one-fifth of the time taken by the conventional method. Referring to FIG. 16, each image used in an experiment had a size of 2458*1030. Referring to FIG. 17, it also seems that there is little difference between the result images, but the time required to produce the result image according to the present invention is reduced to about one half of the time taken by the conventional method. That is, the required time is greatly reduced when the homography estimation method according to the present invention is applied to an image, especially a large image.

The homography estimation apparatus and method can down-sample the reference image and the target image to thereby significantly reduce a feature point extraction time and a homography estimation time, and also a time required to calculate a homography for an original image from the estimated homography.

The invention can also be embodied as computer-readable codes on a computer-readable recording medium. The computer-readable recording medium is any data storage device that can store data which can thereafter be read by a computer system. Examples of the computer-readable recording medium include a ROM, a RAM, a CD-ROM, a magnetic tape, a floppy disk, and an optical data storage. Further, the recording medium may be implemented in the form of carrier waves such as those used in Internet transmission. The computer-readable recording medium can also be distributed over computer systems connected through a wired/wireless communication network so that the computer-readable code is stored and executed in a distributed fashion.

While the present invention has been particularly shown and described with reference to preferred embodiments thereof, it should not be construed as being limited to the embodiments set forth herein. It will be understood by those skilled in the art that various changes in form and details may be made to the described embodiments without departing from the spirit and scope of the present invention as defined by the following claims.

What is claimed is:

1. A homography estimation apparatus comprising:
a processor configured to execute operations as follows:
(a) reduce a reference image and a target image;
(b) generate a down-sampled image of the reference image and a down-sampled image of the target image;
(c) extract feature points from the down-sampled image of the reference image and the down-sampled image of the target image, respectively;
(d) match the feature points extracted from the down-sampled image of the reference image with the feature points extracted from the down-sampled image of the target image to detect and remove outliers, which are feature points that do not match, from the matched feature points;
(e) estimate a homography using feature points from which the detected outliers have been removed; and
(f) repeat execution of operations (a) through (e) n times, where n is a positive integer greater than or equal to two, wherein
in each of the n iterations of operations (a) through (e), the processor reduces the reference image and the target image to a different size, and estimates a homography using the different reduced sizes of the reference image and the target image, resulting in n different homographies, and
the processor calculates a homography error for each of the estimated n homographies, the homography error being a difference between coordinates of the reference image and coordinates of the estimated homography, selects a homography corresponding to the smallest error among the homography errors, and corrects the reference image using the selected homography based on an equation:

$$H = \begin{bmatrix} 1 & 0 & 0 \\ 0 & 1 & 0 \\ 0 & 0 & 1/m \end{bmatrix} H' \begin{bmatrix} 1 & 0 & 0 \\ 0 & 1 & 0 \\ 0 & 0 & m \end{bmatrix} = \begin{bmatrix} h_{11} & h_{12} & h_{13} \\ h_{21} & h_{22} & h_{23} \\ h_{31} & h_{32} & h_{33} \end{bmatrix},$$

wherein H is a corrected homography, H' is a homography calculated from a down-sampled image, m is a scale factor that indicates the extent to which an image is reduced when H' is calculated, $h_{13}$ and $h_{23}$ are values obtained by multiplying by m, and $h_{31}$ and $h_{32}$ are values obtained by multiplying by 1/m.

2. The homography estimation apparatus of claim 1, wherein the processor is further configured to match the reference image with the target image using the estimated homography to generate a panorama image.

3. The homography estimation apparatus of claim 1, wherein the processor extracts feature points using a Scale Invariant Feature Transform (SIFT) algorithm.

4. The homography estimation apparatus of claim 3, wherein the processor detects and removes outliers, which are feature points that do not match, using a Random Sample Consensus (RANSAC) algorithm.

5. A homography estimation method performed by a homography estimation apparatus, comprising:
(a) reducing a reference image and a target image;
(b) generating a down-sampled image of the reference image and a down-sampled image of the target image;
(c) extracting feature points from the down-sampled image of the reference image and the down-sampled image of the target image, respectively;
(d) matching the feature points extracted from the down-sampled image of the reference image with the feature points extracted from the down-sampled image of the target image to detect and remove outliers, which are feature points that do not match, from the matched feature points;
(e) estimating a homography using feature points from which the detected outliers have been removed; and
(f) repeat execution of operations (a) through (e) n times, where n is a positive integer greater than or equal to two, wherein
in each of the n iterations of operations (a) through (e), the reference image and the target image are reduced to a different size, and a homography is estimated using the different reduced sizes of the reference image and the target image, resulting in n different homographies, and
the homography estimation method further comprises: calculating a homography error for each of the estimated n homographies, the homography error being a difference between coordinates of the reference image and coordinates of the estimated homography, selecting a homography corresponding to the smallest error among the homography errors, and correcting the reference image using the selected homography based on an equation:

$$H = \begin{bmatrix} 1 & 0 & 0 \\ 0 & 1 & 0 \\ 0 & 0 & 1/m \end{bmatrix} H' \begin{bmatrix} 1 & 0 & 0 \\ 0 & 1 & 0 \\ 0 & 0 & m \end{bmatrix} = \begin{bmatrix} h_{11} & h_{12} & h_{13} \\ h_{21} & h_{22} & h_{23} \\ h_{31} & h_{32} & h_{33} \end{bmatrix},$$

wherein H is a corrected homography, H' is a homography calculated from a down-sampled image, m is a scale factor that indicates the extent to which an image is reduced when H' is calculated, $h_{13}$ and $h_{23}$ are values obtained by multiplying by m, and $h_{31}$ and $h_{32}$ are values obtained by multiplying by 1/m.

6. The homography estimation method of claim 5, further comprising (g) matching the reference image with the target image using the estimated homography to generate a panorama image.

7. The homography estimation method of claim 5, wherein operation (c) comprises extracting the feature points using a Scale Invariant Feature Transform (SIFT) algorithm.

8. The homography estimation method of claim 5, wherein operation (d) comprises detecting and removing the outliers, which are feature points that do not match, using a Random Sample Consensus (RANSAC) algorithm.

9. A non-transitory computer-readable medium having recorded thereon a program for executing the homography estimation method of claim 5.

* * * * *